Figure 1:
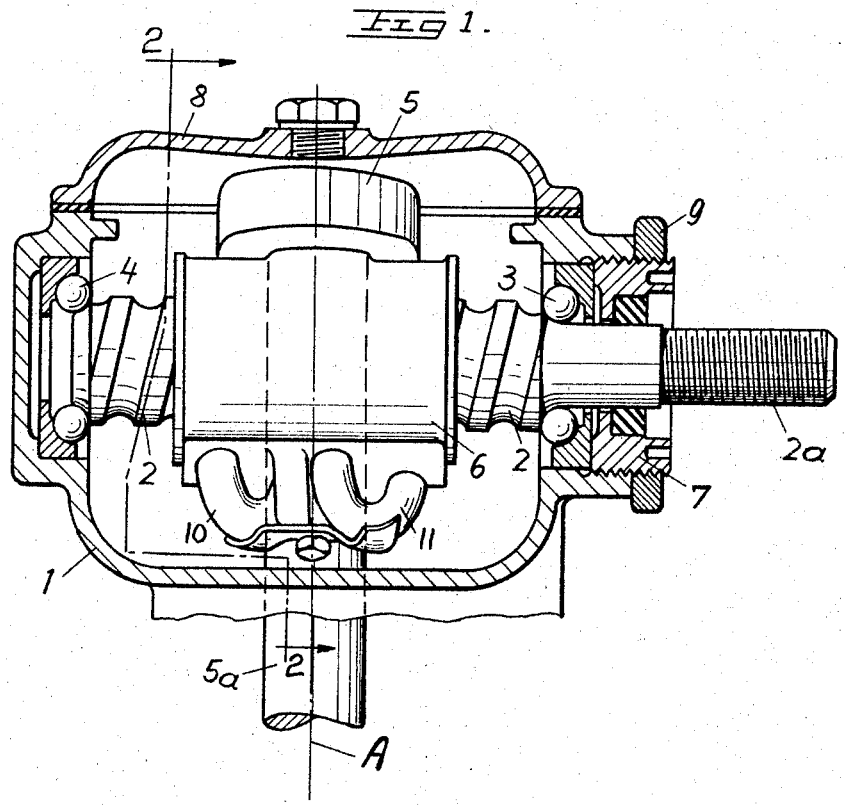

July 28, 1959

E. STUMP 2,896,473

STEERING MECHANISM FOR MOTOR VEHICLES

Filed Jan. 27, 1954

2 Sheets-Sheet 1

INVENTOR.
EUGEN STUMP.

BY Dicke and Craig.

ATTORNEYS

July 28, 1959  E. STUMP  2,896,473
STEERING MECHANISM FOR MOTOR VEHICLES
Filed Jan. 27, 1954  2 Sheets-Sheet 2

INVENTOR.
EUGEN STUMP
BY Dicke and Craig
ATTORNEY

United States Patent Office 2,896,473
Patented July 28, 1959

2,896,473

STEERING MECHANISM FOR MOTOR VEHICLES

Eugen Stump, Stuttgart-Unterturkheim, Germany, assignor to Daimler-Benz Aktiengesellschaft, Stuttgart-Unterturkheim, Germany Application January 27, 1954, Serial No. 406,412

Claims priority, application Germany January 30, 1953

4 Claims. (Cl. 74—499)

The present invention relates to a steering mechanism for motor vehicles. More particularly, the present invention relates to a ball bearing drive mechanism for the steering mechanism of motor vehicles similar to that shown in the Patent 2,780,943 issued to the same inventor in which the steering spindle or shaft provided with helical grooves forming a screw, which is connected with the steering wheel, the nut which is adjustably positioned over the screw and the rocker arm which is connected with the nut and which transmits steering motion to the steering links, are supported in a hollow body which consists of a housing and a plurality of covers.

It is accordingly an object of the present invention to provide a ball bearing drive mechanism for steering devices in motor vehicles which is simple in structure and inexpensive to manufacture.

It is another object of the present invention to provide a ball bearing drive mechanism for steering devices in motor vehicles which may be readily assembled and disassembled.

It is a still further object of the present invention to provide a ball bearing drive mechanism for steering devices in motor vehicles which requires relatively few individual parts and which entails reduced expenses in the assembly thereof.

It is another object of the present invention to provide a housing forming a hollow body for the ball bearing drive mechanism of steering devices in motor vehicles which comprises a main housing and two covers which lie in different planes with respect to each other.

A still further object of the present invention resides in the provision of a housing for the drive mechanism for steering devices in motor vehicles wherein the bearings for the steering shaft are supported directly in the housing.

These and other objects and advantages of the present invention will become more obvious from the following description when taken in accordance with the accompanying drawing which shows for purposes of illustration only one preferred embodiment of the present invention, and wherein the single figure is a plan view partially in cross-section of one embodiment in accordance with the present invention.

With the prior art housings, the threaded steering spindle is supported in a housing which is provided with an axial bore therethrough. The roller bearings, in which the screw spindle is journalled, are supported each in an end cover, of which one is formed in the shape of a circular disc, while the other is formed in the shape of a ring. The end covers are fastened to the housing during assembly of the drive mechanism.

In contradistinction thereto, the present invention contemplates a screw spindle which is journalled in a blind-end bore or pouch-like recess of the housing by means of an appropriate thrust bearing so that only two covers are necessary for closing the housing.

More particularly, the gap or opening formed between the housing and the steering shaft which is connected with the steering wheel is closed by means of a closure ring which acts as a cover, while the other opening, which lies in a plane perpendicular to the axis of the shaft which carries the rocker arm, is closed by another cover.

This construction enables the roller bearings to be supported directly in the housing.

The present invention offers the advantage with respect to the prior art devices that the number of the individual parts is smaller and that the cost of assembly is less.

Figure 2:
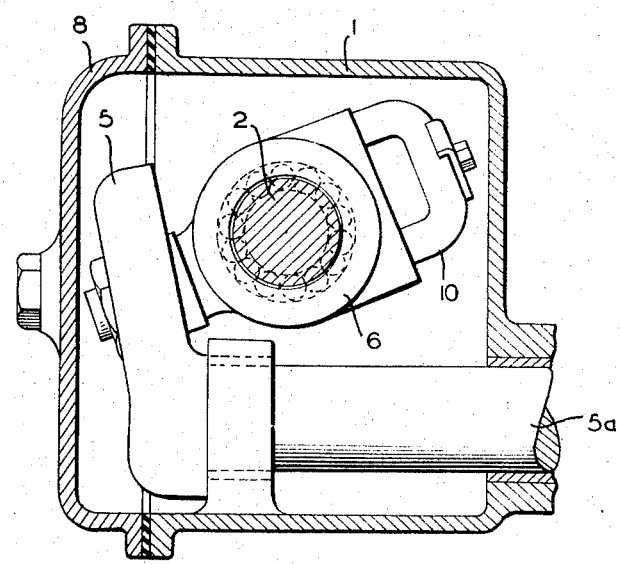

These and other objects, features and advantages of the present invention will become more obvious from the following description when taken in connection with the accompanying drawings which show, for purposes of illustration only, one preferred embodiment of the present invention, and wherein:

Figure 1 is a partial cross section through the steering mechanism for motor vehicles according to the present invention taken in a plane parallel to the steering spindle, and Figure 2 is a partial cross section of the steering mechanism taken along the line 2—2 of Figure 1.

Referring now more particularly to the drawings, wherein like reference numerals are used throughout the various views to designate like parts, reference numeral 1 designates the housing, the worm 2, which is located at the end of steering spindle or shaft 2a and which is provided with helical grooves forming an external screw, is journalled in housing 1 by means of appropriate bearings 3 and 4. The shaft 5a which carries the rocker arm 5 is also journalled in housing 1. The nut 6, which is provided with internal helical grooves cooperating with the grooves of spindle 2 by means of balls, connects the rocker arm 5 with the screw spindle 2 to transmit the steering movement from the steering shaft 2a to the steering links (not illustrated) in a well known manner.

The closure ring 7 closes the gap between housing 1 and the steering shaft 2a which connects the screw spindle 2 with the steering wheel (not illustrated).

The cover 8 closes the second opening in housing 2 within the range of the nut 6.

Reference numeral 9 designates a lock nut to secure the ring 7 against housing 1.

The separating gap between cover 8 and housing 1 is preferably arranged in a plane perpendicular to the axis A of the shaft 5a, so that the rocker arm assembly may be inserted therethrough as well as nut 6 and its parts 10 and 11.

The nut 6 may include tubes 10 and 11 in which balls of the endless-row type are provided.

The bore provided in housing 1, in which shaft 2a is journalled by means of bearing 3, is of such dimension that threaded spindle 2 may be inserted therethrough and is in substantial axial alignment with the recess supporting bearing 4.

While I have shown and described one preferred embodiment of my invention it is understood that it is not limited thereto, but is susceptible of many changes and modifications within the scope of a person skilled in the art, and I intend to cover any such changes and modifications except as defined by the appended claims.

I claim:

1. A ball bearing drive mechanism for steering devices in vehicles including a steering spindle having a worm, a nut displaceably positioned over said worm, a rocker arm connected with said nut, and a cross shaft crossing said worm and supporting said rocker arm, said rocker arm transmitting motion from said worm to said cross shaft, comprising a multi-part hollow body enclosing said mechanism including a housing provided with a dead-end bore, bearing means for supporting said spindle in said dead-end bore, said housing being provided with a first opening for the passage of said spindle, a first cover means for closing the gap formed in said first opening between said spindle and said housing with second bearing means for said spindle and adjusting means for said second bearing means, a second opening provided in said housing lying in a plane forming an angle with the plane of said first opening, and disposed in the side of said body adjacent said rocker arm to enable insertion thereof through said second opening, and another cover means for closing said second opening.

2. A ball bearing drive mechanism for steering devices in vehicles including a partially threaded steering shaft forming a worm, a nut positioned over the threaded part of said steering shaft and cooperating therewith, a cross shaft crossing said partially threaded steering shaft, and a rocker arm supported by said cross shaft and operatively connected with said nut for transmitting steering movement from said partially threaded steering shaft to said cross shaft, comprising a housing for said mechanism provided with a pouch-like recess and a first opening therein, said recess being substantially axially aligned with said first opening, bearing means for supporting said partially threaded steering shaft in said recess, a second opening provided in said housing in a plane substantially perpendicular to the axis of said rocker arm and disposed in the side of said body adjacent said rocker arm to enable insertion thereof through said second opening, means for closing said first opening including bearing means and means for adjusting said bearing means, and means for closing said second opening.

3. The combination according to claim 1, wherein said first and second bearing means are thrust ball bearing means.

4. The combination according to claim 1, further comprising lock nut means for securing said adjusting means in said housing body.

References Cited in the file of this patent

UNITED STATES PATENTS

| | | |
|---|---|---|
| 1,193,133 | Flora | Aug. 1, 1916 |
| 2,045,811 | Twyman | June 30, 1936 |
| 2,648,994 | Doerfner et al. | Aug. 18, 1953 |

FOREIGN PATENTS

| | | |
|---|---|---|
| 520,359 | Great Britain | Apr. 22, 1946 |